UNITED STATES PATENT OFFICE.

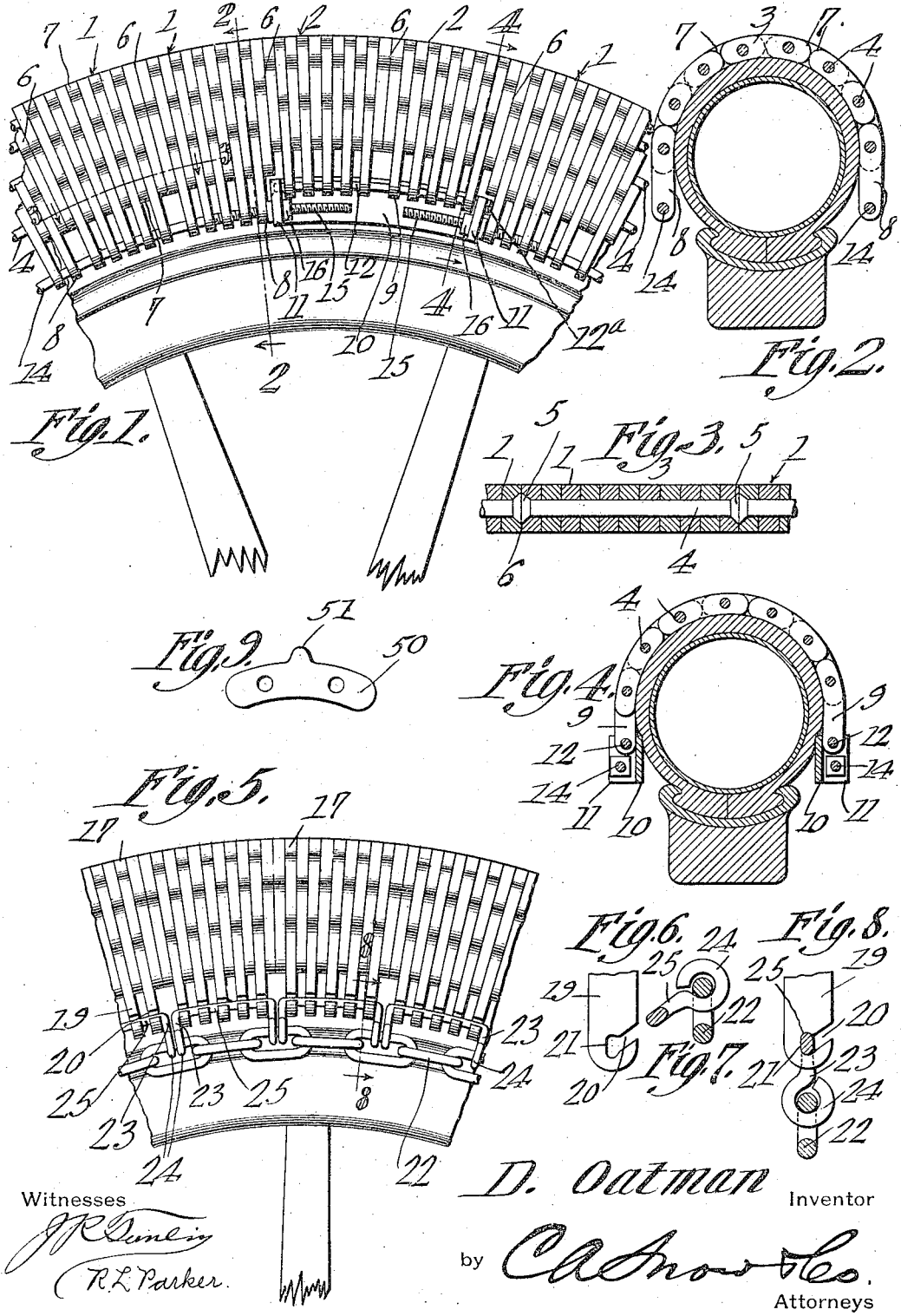

DUKE OATMAN, OF CORPUS CHRISTI, TEXAS.

TIRE-ARMOR.

1,241,006.   Specification of Letters Patent.   Patented Sept. 25, 1917.

Application filed June 12, 1915. Serial No. 33,730.

*To all whom it may concern:*

Be it known that I, DUKE OATMAN, a citizen of the United States, residing at Corpus Christi, in the county of Nueces and State of Texas, have invented a new and useful Tire-Armor, of which the following is a specification.

The device forming the subject matter of this application is a flexible protector adapted to be applied to a vehicle tire.

One object of the invention is to provide a structure of this sort comprising a plurality of individually removable sections, each section comprising a plurality of pivotally connected links, the construction being such that any one section when damaged, may be removed independently of the other sections and be replaced by a new section.

Another object of the invention is to provide novel means for maintaining the protector assembled with the tire which the protector shields.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without in the scope of what is claimed, without departing from the spirit of the invention.

In the accompanying drawing:—

Figure 1 shows in fragmental side elevation, a portion of a tire armor or protector constructed in accordance with the present invention;

Fig. 2 is a cross section on the line 2—2 of Fig. 1;

Fig. 3 is a fragmental circumferential section on the line 3—3 of Fig. 1;

Fig. 4 is a section taken approximately on the line 4—4 of Fig. 1;

Fig. 5 is a fragmental side elevation showing a modified form of the invention;

Fig. 6 is a side elevation showing a portion of one of the terminal links in the protector depicted in Fig. 5;

Fig. 7 is a sectional detail illustrating the pivotally mounted bail which coöperates with the link of Fig. 6;

Fig. 8 is a section taken approximately on the line 8—8 of Fig. 5.

Fig. 9 is an elevation showing a modified form of link.

The protector forming the subject matter of this application comprises any desired number of sections 1 and a pair of sections 2, the sections 1 being continued entirely around the circumference of the tire which the protector is adapted to shield. The several sections 1 and 2 are independently removable, as will be made manifest hereinafter, each section comprising a plurality of transverse lines of links, ordinarily made of metal, and designated by the reference character 3. The lines of links in the respective sections are united by circumferential securing devices 4 preferably in the form of rivets or the like, there being preferably two securing devices 4 to each link, and the links in the respective lines in each section being disposed in alternating order, transversely of the sections. The links 3 are pivotally mounted on the securing devices 4, so that the protector may be flexible, the heads 5 of the securing devices being in abutment, and being countersunk into the sections as clearly indicated in Fig. 3. Circumferentially of the protector, each section may abut against an adjoining section, as the drawings clearly disclose at 6. The ends of the links 3 in each line may be rounded as shown at 7, and preferably abut with a rocking motion against each other.

The terminal links of the sections 1, that is, those links which lie adjacent the sides of the protector, are designated by the reference character 8, the reference character 9 denoting the terminal links of the sections 2. The invention comprises an arched or U-shaped tie member 10 having rectangular, outwardly projecting ends 11. The tie 10 coacts with the sections 2, there being a tie 10 at each side of the protector adjacent the sections 2. The particular securing device 12 upon which the terminal links 9 of the sections 2 are pivotally mounted is terminally received in the ends 11 of the tie 10, a nut 12ᵃ coacting with one of the ends 11, as clearly shown in Fig. 1. Circumferential holding members 14 are provided, the same passing through the terminal links 8 of the sections 1 and passing also through the ends 11 of the tie 10. The ends of the circumferential holding members are threaded as shown at 15 to receive nuts 16 which bear against the ends 11 of the tie 10. Obviously, the tie 10, the circumferential holding member 14, and the nuts 16 constitute tightening devices whereby the protector is held in place on the tire.

Owing to the fact that the protector comprises a plurality of sections 1 and 2, any of these sections when damaged may be removed and replaced by a perfect section. Further, the provision of a plurality of sections serves to increase the flexibility of the protector.

In that form of the invention which is delineated in Figs. 5, 6, 7 and 8, practically the only change made is in the circumferential holding means. A detailed description of that form of the invention under discussion is not necessary, saving as to its peculiar differentiating features, the structure of Figs. 5, 6, 7 and 8 embracing substantially all of the details hereinbefore discussed, saving as hereinafter modified. The links are indicated at 17 and the securing devices are of the sort hereinbefore described and denoted by the numeral 4. The numeral 19 designates the terminal or side links of the respective sections, these links being equipped in their outer edges with inclined slots 20 terminated in enlarged recesses 21. The circumferential holding members may be in the form of side chains 22, although this detail is not insisted upon.

The invention as disclosed in Fig. 5 comprises a plurality of bails 23, there being one bail to each removable section. The ends of the bails terminate in eyes 24 which are pivotally mounted on certain links of the side chains or circumferential holding members 22, presupposing that chains are employed. The intermediate portions 25 of the bails 23 are of unequal transverse dimensions. In order to assemble the bails 23 with the terminal links 19, the bails are inclined as shown in Fig. 7 so that the longer transverse dimensions of the intermediate portions 25 of the bails stand parallel to the length of the slots 20. Then the intermediate portions of the bails are inserted into the recesses 21 through the slots 20, and the bails are vertically disposed, so that the longer transverse dimensions of the intermediate portions 25 of the bails stand crosswise of the slots 20, as clearly shown in Fig. 8, under which circumstances, the terminal links cannot readily become detached from the bails.

In the form of the invention shown in Fig. 5, no tightening device, preferably, is used, in the circumferential holding members represented by the chains 22, the protector being assembled with the tire while the tire is deflated, and the latter subsequently being inflated to distend the tire and the protector.

In Fig. 9 of the drawings, the link is indicated by the reference character 50 and is provided with an anti-skidding projection 51.

The tire armor forming the subject matter of this application is puncture proof. The circumferential elements coact with the side portions of the armor, and when the tire which the armor incloses is inflated, the armor will be held in place, the invention thus being distinguished clearly from those structures hooked, chained or otherwise secured in place to the rim.

Having thus described the invention, what is claimed is:—

A flexible tire protector embodying a plurality of transverse individually removable sections, the sections including a plurality of transverse lines of links, alternate lines comprising outer links which are longer than the remaining shorter links, the sections terminating at their ends in lines of shorter links, and said lines of shorter links being in abutment at the ends of adjoining sections, thereby to space the terminal outer links of adjoining sections apart by a distance equal to twice the thickness of said shorter links; means for pivotally connecting the lines of links in each section independently of the lines of links of an adjoining section; and circumferential holding means engaged with the outer links and including transversely projecting parts disposed between certain of said terminal outer links.

In testimony that I claim the foregoing as my own, I have hereto affixed my signature in the presence of two witnesses.

DUKE OATMAN.

Witnesses:
 J. B. OATMAN,
 J. A. MILLERMAN.